United States Patent [19]

Holman, Jr. et al.

[11] 4,409,020

[45] Oct. 11, 1983

[54] RECOVERY OF METALS FROM GRINDING SLUDGES

[75] Inventors: James L. Holman, Jr.; Leander A. Neumeier, both of Rolla, Mo.

[73] Assignee: The United States of America as represented by the Secretary of the Interior, Washington, D.C.

[21] Appl. No.: 460,102

[22] Filed: Jan. 24, 1983

[51] Int. Cl.³ .............................. C22C 1/04; B02F 9/04
[52] U.S. Cl. .............................. 75/0.5 B; 75/0.5 BA; 75/119; 210/638; 210/912; 423/112; 423/113; 423/130; 423/139; 423/154
[58] Field of Search ......... 75/0.5 B, 0.5 BA, 101 BE, 75/119; 423/112, 113, 139, 130, 154, DIG. 14; 210/638, 634, 695, 757, 758, 912

[56] References Cited

U.S. PATENT DOCUMENTS 3,627,862 12/1971 West et al. ...................... 75/0.5 BA

FOREIGN PATENT DOCUMENTS

| 2664 | 7/1979 | European Pat. Off. ........ 75/0.5 BA |
| 56-25908 | 3/1981 | Japan .............................. 75/0.5 BA |
| 56-25909 | 3/1981 | Japan .............................. 75/0.5 BA |

Primary Examiner—Benôit Castel
Attorney, Agent, or Firm—William S. Brown

[57] ABSTRACT

Metal values, such as Co, Ni, Cu and Fe, are recovered from magnet alloy grinding sludge by means of a process comprising: (1) treatment with an organic solvent to remove a major portion of sulfur and oil contaminants, (2) drying, grinding, sizing and magnetic separation to remove a major portion of grinding media contamination, (3) controlled oxidation-roasting to selectively remove residual sulfur and carbon, and (4) gaseous hydrogen reduction to deoxidize metal values.

4 Claims, No Drawings

RECOVERY OF METALS FROM GRINDING SLUDGES

This invention relates to a process for treating cobalt-nickel-bearing permanent magnet grinding sludges or similar material to remove detrimental contaminants, thus permitting recovery of a metallic alloy product suitable for recycling. The contaminants include elemental sulfur, as well as reaction products such as metal sulfates or sulfides resulting from the action of grinding heat or storage contact. Some sulfuric acid can also form upon sludge storage. Other major contaminants are lubricating oil and water, which, along with other sources such as grinding wheel binder, give rise to carbon contamination. Sulfur and carbon contamination restrict the recyclability of refurnaced sludge since magnet alloys, such as Alnico grades, have low tolerance limits for those elements.

The contaminants may also include refractory grinding materials such as aluminum oxide or silicon carbide. However, due to their inertness and low density, they characteristically float on molten metal and will separate from treated sludge in subsequent reentry to the melting furnace. Other contamination such as oxygen in the form of oxides of Co, Ni, Cu and Fe are relatively reducible with conventional processing. Minor metal oxides, such as titanium oxide, are stable and relatively irreducible, but their recovery as reduced metallic constituent is not required in recovery-recycling processing.

A processing system capable of recovering for recycle a large proportion of the valuable cobalt and nickel, as well as copper and iron, can have a major impact on the magnet and similar alloy industries. For lack of viable processing technology, such contaminated sludge is characteristically either stored or sold at much below intrinsic metal values for processing schemes, often overseas, which lose substantial portions of the metal values in the processing or subsequent downgrading in other alloy melts.

It has now been found, according to the process of the invention, that removal of contaminants from permanent magnet grinding sludge may be efficiently accomplished by means of a process comprising the steps of: (1) removal of a major portion of the sulfur and oil contaminants by means of a solvent such as tetrachloroethylene, (2) drying, grinding, sizing and magnetic separation to remove a major portion of the grinding media, (3) controlled oxidation-roasting to substantially remove residual sulfur and carbon, and (4) hydrogen reduction to deoxidize the desired metals, i.e., cobalt, nickel, copper and iron. The resulting alloy product, similar in metallic constituent compositions to the parent magnet alloys, is then suitable for recharging to a furnace to make master alloys, or for combining with higher-grade charge materials for alloy production.

Grinding sludge such as that generated in the shaping of permanent magnets made with Al-Ni-Co-bearing (Alnico) alloys, or other alloys, is characteristically particulate of variable size range and highly contaminated. The cementing of the magnets with elemental sulfur into fixtures for grinding is a conventional practice. The elemental sulfur becomes an intricate part of the sludge, also forming some surface sulfate or sulfide layers on the particles through the action of the grinding heat or storage after grinding. During grinding, mineral or other oils are used for cooling and lubricating. The oils are often mixed with water, or the sludges pick up water from condensation or storage exposure. The water-sludge reaction can produce acidic sulfate solution. The sludges also become contaminated with carbon from residual oil or grinding wheel binders, and with grinding wheel refractory abrasive, generally alumina or silicon carbide, which mixes with the abraded alloy particles. These alloy particles commonly encircle and lock around the abrasive particles, thereby restricting their mechanical separation. In addition, the contaminated sludge is variously oxidized, depending on factors such as grinding heat exposure and storage period after grinding. Composition of the sludges may vary widely, but those from shaping of Alnico alloys will typically contain about 20 to 35 pct moisture, and on a dried basis, about 10 to 12 pct Co, 5 to 7 pct Ni, 1 to 2 pct Cu, 14 to 18 pct Fe, 3 to 5 pct Al, 1 pct Ti, 10 to 15 pct S (mainly elemental), 5 to 7 pct C, and >25 pct $Al_2O_3$.

In the process of the invention, a major portion of the sulfur and oil contaminants are initially removed from the sludge by means of conventional solvent degreasing techniques. The preferred solvent is tetrachloroethylene, but other organic solvents such as trichloroethylene may be used. A temperature of about 80° to 120° C. is preferred, but optimum temperatures, as well as amount of solvent and time of treatment, may vary considerably depending on the composition of the sludge and the solvent employed. Either the wet sludge or previously air-dried sludge may be thus treated. The sulfur and residual oil can be reclaimed from the solvent by conventional crystallization-distillation procedures, with the solvent being available for recycle. With such treatment, over 90 pct of the elemental sulfur and oil are generally removed.

The desulfurized and deoiled sludge is dried at a temperature of about 90° to 105° C. for a period sufficient to remove about 99+ pct of any remaining water and solvent. The dried product is then abraded in light grinding by conventional means, such as a pulverizer or roll crusher, for a period sufficient to partially free grinding abrasive material, followed by sizing and magnetic separation to segregate a majority of the coarser abrasive material in a low-metallics nonmagnetic fraction. The use of a screen to segregate a majority of the grinding abrasive in the coarser fraction facilitiates magnetic separation. A screen of 60 mesh has been found effective, but the size may vary somewhat for different sludges. The magnetic separation is by means of conventional ferromagnet or low-intensity electromagnet procedures. It has been found that a retention of metallics with the high metallic fraction of at least 95 pct is generally obtainable, with a retention of 99+ pct obtainable under optimum conditions.

At this stage, some sulfur (essentially nonelemental) and carbon contamination remains. A partial oxidation treatment, by controlled air roasting, is then employed to selectively oxidize and remove residual sulfur and carbon, while minimizing oxidation of metal values such as Co, Ni, Cu and Fe. Suitable temperatures for the oxidation will generally range from about 850° to 1,000° C. Temperatures above 1,000° C. increasingly oxidize the metals, without substantial increase in oxidation of sulfur and carbon. The roasting may be carried out in conventional apparatus, such as a rotary drum roaster, and a roasting period of about 1 to 2 hours is usually satisfactory. With appropriate control of oxidation conditions, i.e., with suitable temperature and time, as well as an atmosphere of air, the sulfur and carbon can be readily reduced to below about 0.2 and 0.1 pct, respectively.

The partially oxidized sludge, now with low levels of sulfur and carbon contamination, is given a gaseous hydrogen treatment to deoxidize metals such as Co, Ni, Cu and Fe. Preferred temperatures from the hydrogen treatment are about 1,050° to 1,200° C., with corresponding durations of about 2 to ½ hours. Recovered metallics have been found to have levels of sulfur and carbon well below 0.1 pct, with amounts below 0.05 pct being obtainable with longer periods of oxidation-roasting and hydrogenation. These levels are generally acceptable for melting into metallic alloy for recycle, or for direct addition to magnet alloy melts for preparation of higher-grade charge materials. In either instance, the remaining inert, low-density alumina, or other refractory abrasive, will float from the molten alloy to enter a slag phase. The slag fluidity may be enhanced with conventional additives.

The process of the invention will be more specifically illustrated by the following example.

EXAMPLE

Permanent alloy grinding sludge of the following composition was processed according to the method of the invention.

Moisture: 20 pct

Chemical analysis (dry basis), wt-pct: 10.5 Co, 4.8 Ni, 1.4 Cu, 15.3 Fe, 1.0 Ti, 2.6 Al, 12.7 S (8.8 elemental), 5.9 C, and 26 $Al_2O_3$.

A sample of the sludge was dried by heating in air at 105° C.; 90 pct of the moisture was removed in 8 hrs. The dried sludge was crushed to minus 20-mesh with a mortar-pestle, and was treated in tetrachloroethylene solvent at 112° C. for 1 hr, followed by hot filtering to separate the sludge from the sulfur-oil-laden tetrachloroethylene. The resulting sludge was dried, ground (mortar-pestle) for a short period to partly liberate metallics from alumina abrasive, and was screened on a 60-mesh screen.

Approximately 25 pct of the material was plus 60-mesh and 75 pct was minus 60-mesh. Distribution, in wt-pct, of the constituents, as determined by analysis, is shown in the following table.

TABLE 1

| Mesh fraction | wt-pct | Co | Ni | Cu | Fe | Ti | $Al^1$ | $Al_2O_3$ | $So^2$ | $S_t^3$ | C |
|---|---|---|---|---|---|---|---|---|---|---|---|
| +60 | 25 | 9.9 | 8.8 | 7.5 | 11.8 | 7.8 | 7.1 | 59.5 | 9.2 | 8.4 | 16.1 |
| −60 | 75 | 90.1 | 91.2 | 92.5 | 88.2 | 92.2 | 92.9 | 40.5 | 90.8 | 91.6 | 83.9 |

[1] As metallic aluminum in alloy.
[2] Elemental sulfur.
[3] Total sulfur.

The plus 60-mesh and minus 60-mesh fractions were dispersed in methyl alcohol and magnetically separated with a permanent hand ferromagnet. Distribution, in wt-pct, of the constituents is shown in the following table.

TABLE 2

| Mesh fraction[1] | wt-pct | Co | Ni | Cu | Fe | Ti | $Al^2$ | $Al_2O_3$ | $S_t^3$ | C |
|---|---|---|---|---|---|---|---|---|---|---|
| +60 M | 7.5 | 9.4 | 9.0 | 8.1 | 11.7 | 6.5 | 7.2 | 1.3 | 9.1 | 4.8 |
| +60 NM | 16.7 | 0.6 | 0.5 | 0.5 | 0.6 | 1.5 | 0.1 | 59.4 | 0.7 | 9.7 |
| −60 M | 54.8 | 73.4 | 72.4 | 68.5 | 70.9 | 78.6 | 74.1 | 19.0 | 61.7 | 61.8 |
| −60 NM | 21.0 | 16.6 | 18.1 | 22.9 | 16.8 | 13.4 | 18.6 | 20.3 | 28.5 | 23.7 |

[1] M = magnetic; NM = nonmagnetic.
[2] Metallic aluminum in alloy.
[3] Total sulfur.

The plus 60-mesh nonmagnetic fraction, containing about 60 pct of the alumina abrasive and well below 1 pct each of the Co, Ni, Cu and Fe, was removed from further processing. The minus 60-mesh nonmagnetic fraction retained too much nonliberated metallics for effective alumina removal and this fraction was recombined with the magnetic fraction for further processing.

After air drying, the sludge was roasted in air at 950° C. for 1.5 hrs. Chemical analysis of the roasted sludge was (weight-percent):

TABLE 3

| Co | Ni | Cu | Fe | Ti | $Al^1$ | $Al_2O_3$ | $S_t^2$ | C |
|---|---|---|---|---|---|---|---|---|
| 17.1 | 8.1 | 2.2 | 24.9 | 1.9 | 5.3 | 15.9 | 0.2 | 0.06 |

[1] Metallic aluminum in alloy.
[2] Total sulfur.

The sludge was then given a hydrogen reduction treatment at 1,200° C. for about 2 hrs. The chemical analysis of the reduced sludge sample was:

TABLE 4

| Co | Ni | Cu | Fe | Ti | $Al^1$ | $Al_2O_3$ | $S_t^2$ | C |
|---|---|---|---|---|---|---|---|---|
| 20.3 | 10.0 | 2.5 | 30.4 | 2.3 | 1.0 | 30.2 | 0.01 | 0.06 |

[1] Metallic aluminum in alloy.
[2] Total sulfur.

Except for the alumina, present as residual alumina grinding media plus alumina formed from metallic aluminum in the alloy during the hydrogen reduction (aluminum reactive to oxygen from water vapor and trace oxygen and nonreducible by hydrogen), the composition in the treated sludge powder contained no contaminants at levels considered detrimental to recycle for magnet alloy production, oxidized reactive metals such as aluminum and titanium remain stable and enter the slag in remelting. The product after hydrogen reduction consisted of 40 pct of the starting weight before drying (49 pct dry basis).

The high level of contaminant removal makes the resultant powder a valuable and recyclable material. To illustrate this, an induction-heated melt was made by melting together about 20 wt-pct treated sludge and 80 wt-pct Alnico 5 (consisting of, in wt-pct, 8.5 Al, 14.5 Ni, 24 Co, 3 Cu, balance Fe). Over 99 pct of the metals Co, Ni, Cu and Fe contained in the treated sludge was recovered in the resultant alloy ingot, with the alumina abrasive essentally totally reporting to the slag. The sulfur, carbon, and alumina contents of the resultant alloy were <0.01, 0.045, and <0.06 pct, respectively.

We claim:

1. A process for recovery of metal values from magnet alloy grinding sludge comprising the sequential steps of:
   (1) removing a major portion of sulfur and oil contaminants from the sludge by means of an organic solvent,
   (2) drying the desulfurized and deoiled sludge at a temperature of about 90° to 105° C. for a period sufficient to remove substantially all remaining water and solvent, and obtain a dried product,
   (3) grinding the dried product for a period sufficient to partially free grinding abrasive material,
   (4) subjecting the ground product to sizing and magnetic separation to segregate a majority of the coarser abrasive material in a low-metallics nonmagnetic fraction,
   (5) oxidation-roasting of the sludge at a temperature of about 850° to 1,000° C. to selectively remove residual sulfur and carbon, and
   (6) subjecting the oxidized sludge to a gaseous hydrogen reduction at a temperature of about 1,050° to 1,2000° C. to reoxidize and recover purified metal values.

2. The process of claim 1 in which the metal values comprise Co, Ni, Cu and Fe.

3. The process of claim 1 in which the magnet alloy is Al-Ni-Co-bearing alloy.

4. The process of claim 1 in which the organic solvent is tetrachloroethylene.

* * * * *